United States Patent
Sadiq

(10) Patent No.: US 7,263,686 B2
(45) Date of Patent: Aug. 28, 2007

(54) SYSTEM AND METHOD FOR AUTOMATED CODE GENERATION USING LANGUAGE NEUTRAL SOFTWARE CODE

(75) Inventor: Waqar Sadiq, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 382 days.

(21) Appl. No.: 10/407,849

(22) Filed: Apr. 4, 2003

(65) Prior Publication Data

US 2004/0148588 A1    Jul. 29, 2004

Related U.S. Application Data

(63) Continuation-in-part of application No. 10/350,164, filed on Jan. 23, 2003.

(51) Int. Cl.
*G06F 9/44* (2006.01)
*G06F 15/16* (2006.01)

(52) U.S. Cl. .................. 717/110; 717/115; 717/118; 709/203

(58) Field of Classification Search ........ 717/100–123; 707/513
See application file for complete search history.

(56) References Cited

U.S. PATENT DOCUMENTS

| | | | |
|---|---|---|---|
| 6,061,740 A | 5/2000 | Ferguson et al. | |
| 6,205,476 B1 | 3/2001 | Hayes, Jr. | |
| 6,446,110 B1 * | 9/2002 | Lection et al. | 709/203 |
| 6,643,652 B2 * | 11/2003 | Helgeson et al. | 707/10 |
| 2002/0023261 A1 | 2/2002 | Goodwin et al. | |
| 2002/0040388 A1 * | 4/2002 | Ternullo et al. | 709/218 |
| 2004/0049481 A1 * | 3/2004 | Blevins | 707/1 |
| 2004/0205772 A1 * | 10/2004 | Uszok et al. | 719/317 |

FOREIGN PATENT DOCUMENTS

| | | |
|---|---|---|
| WO | WO 00/22505 | 4/2000 |
| WO | WO 01/14962 A1 | 3/2001 |
| WO | WO 02/069086 A2 | 9/2002 |

* cited by examiner

*Primary Examiner*—Tuan Dam
*Assistant Examiner*—Chuck Kendall
(74) *Attorney, Agent, or Firm*—Munck Butrus P.C.

(57) ABSTRACT

A system and method for composing, configuring, deploying, and managing services in a data processing system and data processing system network. This system provides a means for application infrastructure services to insert specific programming code in the generated code. When code generator starts, it also loads the plugs for the infrastructure services being used by the container. The code generator creates XML documents for all the code that it wants to generate. It then invokes the infrastructure service plugs and provides them an opportunity to add code specific to them by passing the XML documents representing the code to be generated. Once all the plugs have added their code, the code generator converts the XML documents back into either language specific code or configuration code, as necessary.

21 Claims, 8 Drawing Sheets

SYSTEM AND METHOD FOR AUTOMATED CODE GENERATION USING LANGUAGE NEUTRAL SOFTWARE CODE

CROSS REFERENCE TO RELATED APPLICATIONS

The present application is a continuation-in-part of U.S. patent application Ser. No. 10/350,164, filed 23 Jan. 2003, for "System And Method For Composing, Configuring, Deploying, And Managing Services Using A Graphical User Interface," which is hereby incorporated by reference, and claims the benefit of the filing date thereof.

This application also shares at least some common text and figures with, but is otherwise unrelated to, commonly assigned U.S. patent application Ser. No. 10/407,896 for "System And Method For Providing A Plug-And-Play Architecture For Integrating Infrastructure Services With Business Service Implementations," U.S. patent application Ser. No. 10/407,872 for "System And Method To Manage The Distribution Of Services Software In A Distributed Network," and U.S. patent application Ser. No. 10/407,812 for "System And Method For Customizing Infrastructure Services For Use In Network Services," all filed concurrently herewith, and which are hereby incorporated by reference.

TECHNICAL FIELD OF THE INVENTION

The present invention is directed, in general, to data processing system services development and management.

BACKGROUND OF THE INVENTION

In the area of conventional business service development, there are, in general, three major roles, each role having specific tools to address its needs.

Application architects are primarily concerned with defining the contracts of the business services to meet the business requirements. An application contract consists of one or more interface definitions, reflecting the right level of interface granularity and service behavior such as operations exposed and their inputs and outputs.

An important aspect of the architect's task here is to ensure that existing interface types are reused so that multiple interface types and messages are not reinvented to fulfill similar requirements.

Once the correct interfaces have been defined, the application developers are ready to implement those interfaces. This often involves writing code that implements business logic. The developers also have to be able to unit test the code that they have just written.

Finally, once the code has been developed, it can be given to the system administrators for configuration, deployment and management. They can then configure the runtime execution environment for the newly developed service and deploy the application. Once deployed, the application can then be managed through the means available in the environment.

In the conventional development model, the applications are developed from scratch. This allows the users to perform top-down design and leverage the full capabilities of the available technologies since no baggage needs to be carried from the past.

Currently, there are 5 major phases of the lifecycle of the business services. In the model phase, the application architects design the interfaces for the business services to be developed. Once the interfaces have been designed, the business logic is developed by the developers of the system. The system architects then configure the runtime for the business service and the administrators then deploy and manage the business services.

In many cases, the business services already exist but are not manageable. These services may be either 3rd party off-the-shelf (COTS) applications or custom applications developed in-house or by system integrators.

This style of development is bottom-up development where the interfaces are actually constructed based on existing applications. The architects first use introspection to reverse engineer metadata from the existing applications. These applications may exist in one of many supported technologies such as Java classes, CORBA, EJB's, existing web services or COTS packages such as SAP or Siebel. Introspection would result in one-to-one interface generation. However, in real world, these interfaces may need to be refactored. Refactoring involves either suppressing some of the operation in an interface, creating brand new ones, combining two or more interfaces (contract aggregation) or splitting a contract into two or more contracts (contract dissemination).

It should be noted that the existing applications could also be web services. The process should however be no different than that for 3rd party COTS or custom applications supporting a particular technology.

Business logic generally does not change in nature. However, the underlying technologies are changing very rapidly. For example, there are a number of new standards that are being developed to address various aspects of distributed business services. Many standards do not have any sort of industry consensus and many areas have competing standards. However, the applications have to be developed today. Typically, the business services are written to provide all the other necessary functionality, such as security and others (application infrastructure services) that do not actually contribute to the business behavior itself. As the standards and technologies for these other services (application infrastructure services) evolve, the business services have to be modified and enhanced in order to take advantage of them. Furthermore, in the current state of the art, the configuration and deployment of these services is specific to a particular underlying environment and the underlying products.

In this type of distributed system, it is important that the deployed packages are fully supported by the underlying processes, and that the packages can be easily configured and deployed for use. Often, specific business services require multiple infrastructure services, and it is a common, costly, and time-consuming process to customize business service packages with all the required underlying services.

It would be desirable to provide a system, method, and computer program product which would allow a system to automatically generate program code that insures proper interaction of business services and infrastructure services.

SUMMARY OF THE INVENTION

To address the above-discussed deficiencies of the prior art, and to provide generally improved systems and methods, it is a primary object of the present invention to provide an improved system and method for business services development and management in a data processing system and data processing system network.

The preferred embodiment provides a system and method for composing, configuring, deploying, and managing services in a data processing system and data processing system network. This system provides a means for application infrastructure services to insert specific programming code in the generated code. When code generator starts, it also loads the plugs for the infrastructure services being used by the container. The code generator creates XML documents for all the code that it wants to generate. It then invokes the infrastructure service plugs and provides them an opportunity to add code specific to them by passing the XML documents representing the code to be generated. Once all the plugs have added their code, the code generator converts the XML documents back into either language specific code or configuration code, as necessary. This way, the code generation process can be kept completely independent of a particular infrastructure service while still allowing them to customize the generated code.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive., meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
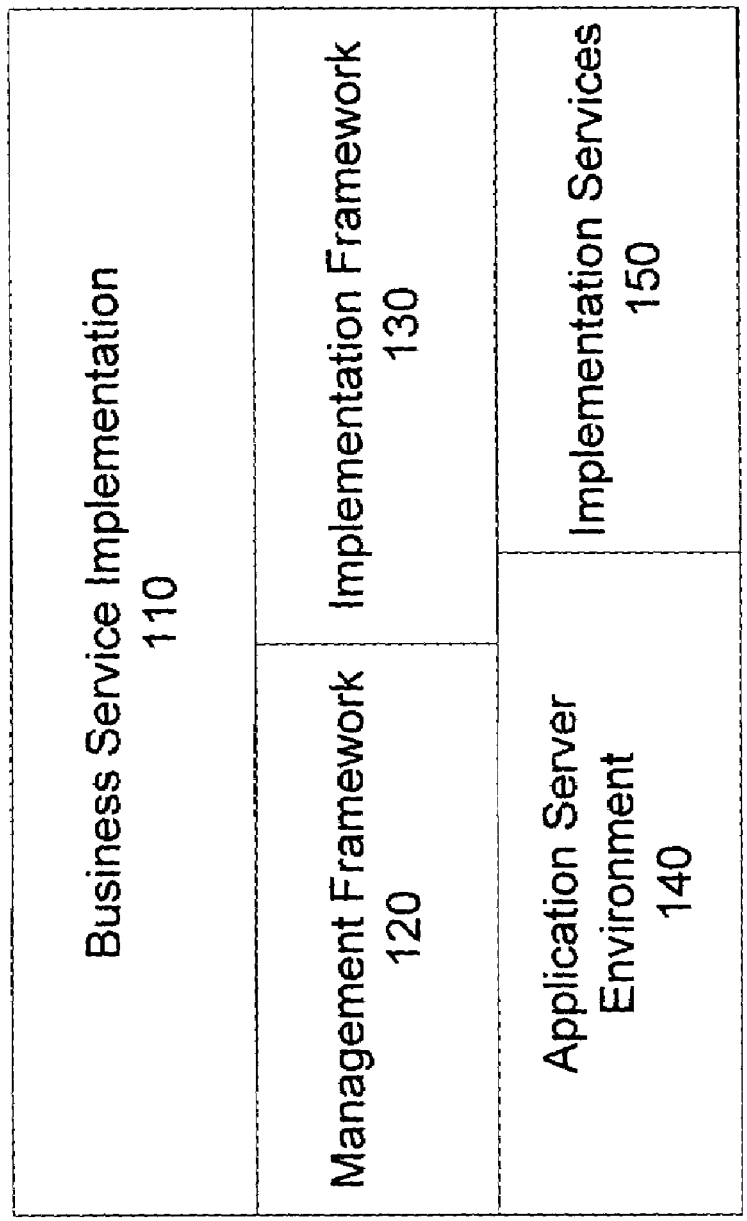
FIG. 1 depicts a block diagram of the relationships between service layers in accordance with a preferred embodiment of the present invention.

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Definitions: Following are short definitions of the usual meanings of some of the technical terms which are used in the present application. (However, those of ordinary skill will recognize whether the context requires a different meaning.) Additional definitions can be found in the standard technical dictionaries and journals.

Business Service Contract—A business service contract describes the business service exposed. This normally contains information such as operations provided by the service, their inputs and outputs.

Business Service Implementation—A business service implementation is the software code required strictly to implement the above mentioned business behavior. This does not include other capabilities such as providing security or managing transactions.

Application Infrastructure Services—Application Infrastructure Services are all those services that themselves do not contribute to the business behavior, however they are necessary for the correct operation of the business service. These services can be added, removed or replaced without changing the business behavior of the business service.

Virtual Container—A virtual container couples a business service implementation with one or more application infrastructure services and provides the definition for a complete business service. This definition exists in metadata and contains all the metadata that customizes the specific usage of application infrastructure services inside the said virtual container.

Physical Business Service—A physical business service is the platform specific programming code that can be generated according to the previously discussed definition of the virtual container. This code can then be compiled and deployed in the underlying platform specific manner.

Web Services will soon be providing complex and mission critical services to business partners and internal customers by providing a viable alternative to most application integration scenarios.

The preferred embodiments provide a system and method for composing, configuring, deploying, and managing services in a data processing system and data processing system network. This system provides a means for application infrastructure services to insert specific programming code in the generated code. When code generator starts, it also loads the plugs for the infrastructure services being used by the container. The code generator creates XML documents for all the code that it wants to generate. It then invokes the infrastructure service plugs and provides them an opportunity to add code specific to them by passing the XML documents representing the code to be generated. Once all the plugs have added their code, the code generator converts the XML documents back into either language specific code or configuration code, as necessary. This way, the code generation process can be kept completely independent of a particular infrastructure service while still allowing them to customize the generated code.

The metadata is managed by a federated metamodel system. A visual composition environment allows composition of a virtual container that couples the business service implementation in question with the application level infrastructure services that it needs. The code generators can then generate platform specific code for the virtual container. All this can be packaged for easy shipment. The packaged business services can then be easily deployed on any of the machines available to the system.

The disclosed embodiments include a method and system for describing the underlying application services infrastructure, a virtual execution environment for business services implementations and a system to integrate the two in a loosely coupled way through metadata so that the two can evolve independently and still stay compatible.

Furthermore, once the metadata has been defined, it becomes very easy to provide user interface based tools that allow construction of a business service by visually composing an execution environment for the already-built business service implementation. The implementation itself does not know about the kind of the environment in which it will be deployed. Because of this, the implementation can be deployed in execution environments that provide vastly different quality of service.

Various embodiments include the following features:

The ability to build business service implementations without any knowledge of the underlying infrastructure environment.

The ability to describe a deployment environment without any knowledge of what kind of business services will be deployed in it.

The ability to enhance an infrastructure environment by providing custom application infrastructure services. These services, by implementing abstract interfaces, can be plugged into any supported infrastructure environment. These application infrastructure services provide discrete non-business related services and do not make any assumptions about who is going to use them and how will they be used.

The ability to construct a virtual container, once the business service implementations have been developed, that integrates them with preexisting infrastructure services and allows for better management.

The ability to describe various components and provide plug-and-play development and deployment using a metadata foundation.

FIG. 1 illustrates these objectives further. A management framework 120 hides the underlying application server environment 140 from the business service implementation 110 and augments the underlying environment by providing the ability to add and integrate application infrastructure services. Further, an implementation framework 130 can be provided that even provides implementation services 150 such as a database management system.

The preferred embodiment provides a platform that provides a level of abstraction, much higher than the one that is provided by application servers and other web services platforms currently available. This platform brings the development, configuration, deployment and management capabilities to the business services.

Figure 2:
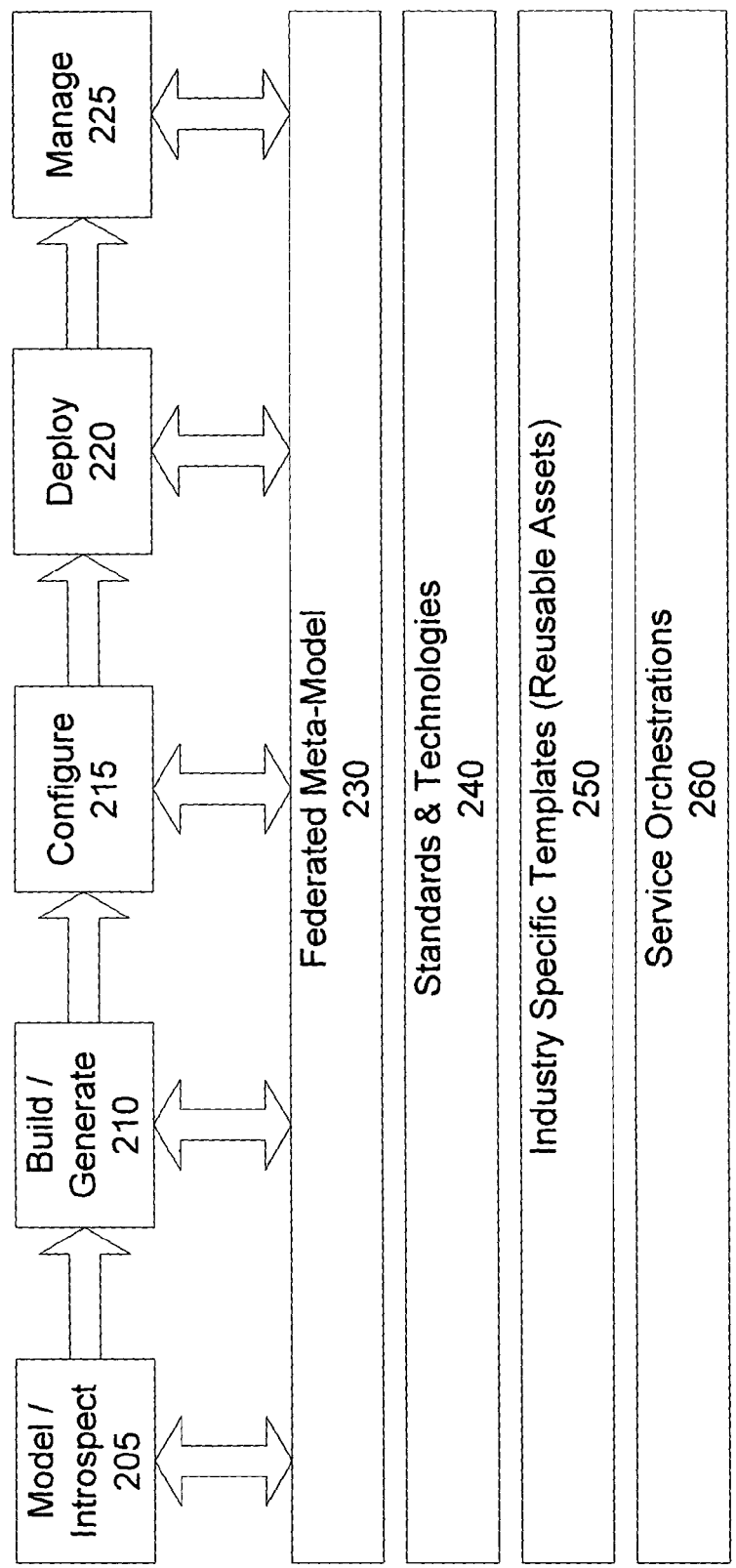
FIG. 2 depicts a block diagram relating a development and deployment lifecycle with data objects and service objects in accordance with a preferred embodiment of the present invention.

The lifecycle shown in FIG. 2 relates to either doing new development or introspecting existing application for the purpose of converting them into managed business services. As described above, the lifecycle includes the model or introspection phase 205, in which the application architects design the interfaces for the business services to be developed or introspect an existing service. In the case of new development, once the interfaces have been designed, the skeleton of business service implementation can be generated and then developed by the developers. In case of existing service, once the existing service has been introspected, a gateway implementation can be automatically generated 210. The system architects then configure 215 the runtime for the business service. Finally, the administrators then deploy 220 and manage 225 the business services.

One disclosed feature of the preferred embodiment is a federated meta-model 230 that stores and provides access to the metadata describing the business services themselves and their infrastructure. This metadata describes the interface of the business service itself, the metadata about those infrastructure services, and the metadata about the virtual container that couples a business service implementation with one or more infrastructure services along with their uniquely customized properties.

The preferred embodiment is designed to expose a level of abstraction higher than those provided by industry standards 240. The standards and technologies in the web services area are changing very rapidly. As a result, the business services that leverage those standards run the risk of becoming outdated very quickly. The preferred embodiment exposes a higher level interface that can be generated by the metadata itself. This results in more stable and longer-lasting applications.

The preferred embodiment provides the horizontal platform that can be used to build the vertical solutions that are more specific to industries in the form of industry specific templates 250. These solutions do not have to be complete themselves. In fact, most likely these solutions will be partial solutions designed to be extended for particular business problems.

Once the business services have been created, they can be orchestrated 260 using business service orchestration tools. These orchestrations themselves can be manifested as web services, thus forming a recursive relationship.

Figure 3:
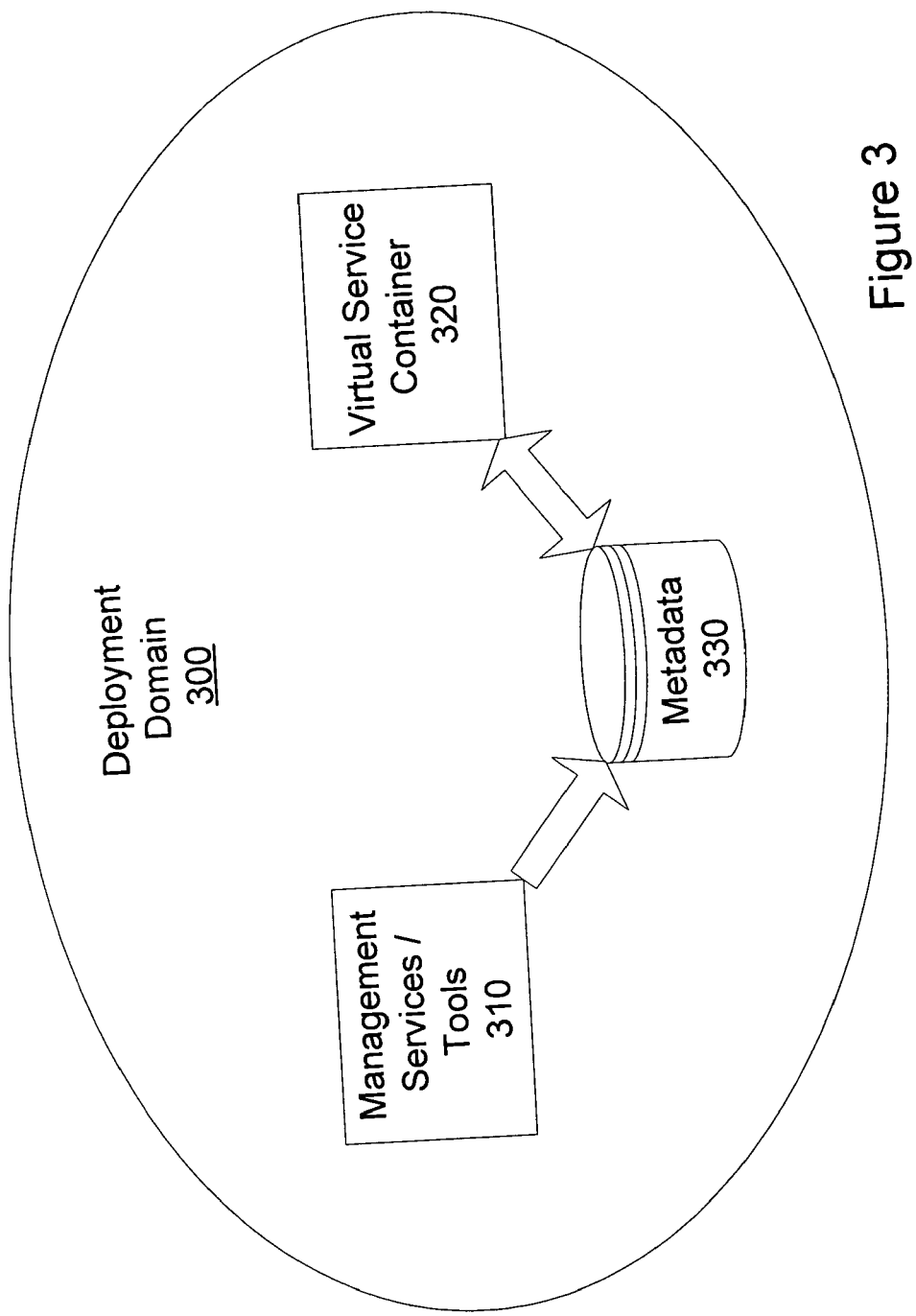
FIG. 3 depicts a block diagram of a runtime environment in accordance with a preferred embodiment of the present invention.

FIG. 3 describes the runtime environment for which the business services are configured and in which they are deployed. This architecture is described here at the logical level and can have one or more physical manifestations, in accordance with the disclosed or claimed embodiments.

A deployment domain 300 is a mechanism for partitioning a large IT environment into smaller logical clusters of machines and applications so that these different clusters can be configured differently from each other. In this case, these deployment domains serve to logically separate environments with different requirements domain. For example, there may be a deployment domain called internal applications. This domain may be configured with a specific security service. Another domain may be for business partners and may be configured with a different kind of security service. Additionally, this domain may also be configured with a management service, e.g., to bill the users for usage of the business service. The deployment domain serves to define the scope of the infrastructure services that it is composed of and the business services that are deployed in it.

The deployment domain defines the logical boundaries and scope of the infrastructure and business services within it. It is a logical partition of a large computing environment which consists of many physical machines. The metadata data related to the deployment domain defines that logical partition.

One or more physical machines can be configured for a deployment domain and one or more application infrastructure services can be made part of the fabric that is a deployment domain. Each server machine, called a host, that is configured to participate in one or more deployment domains will contain a core software service.

The metadata that describes a host can include such items as host name, host's IP address, the core directory path on the host for the application, etc.

Since there is a many-to-many relationship between the hosts and deployment domains, a list of hosts can exist independently of the deployment domains. When a host is configured for a deployment domain, it has to be able to run all of the business services deployed in that domain. The application infrastructure services do not have to run on the host because they can themselves be remote.

An application infrastructure service is defined as a service that provides a discrete non-business level service. Some examples of infrastructure services are security services, transaction services, service monitoring, load balancing, fault tolerance, and messaging service. An infrastructure may also provide some other services such as reliable delivery or asynchronous messaging. These services can also be much higher level; services such as accounting & billing services, service level agreement management services and user profile management services.

The best way to characterize an application infrastructure service or differentiate it from a business service is that business service in itself performs a business function, such as procurement or a human resource system. In contrast, an infrastructure service provides secondary functionality that is not part of the business functions itself.

The metadata of an infrastructure service consists of property sheets with each property sheet containing one or more related properties. For example, a security service may contain five sheets for general properties, authentication, authorization, message integrity, and message confidentiality. Each sheet contains properties that allow customization of the underlying infrastructure service for this specific use. Since these properties are specific to the underlying service, their interpretation is left completely up to the service itself and its plugin. Furthermore, since the property values are specific to the specific usage of this service, these properties need only be defined once a virtual service container is configured with this service.

Once an infrastructure service has been written or purchased, it has to be made part of one or more deployment domains so that it can be used. This is accomplished by defining an abstract plugin interface. This interface allows the deployment management tools and runtime software to plugin an infrastructure service into the deployment domain and allows the service to be used at runtime. The tools that allow the user to visually configure the virtual service container may allow mechanisms to "drag" the infrastructure service and "drop" it on the virtual service container on a canvass. The tools can at this time present the required set of properties to be defined for the service for this particular container. This is accomplished by requesting the plugin to provide its customizable property sheets so that they can be filled.

At runtime, the virtual container receives the requests sent to the business service and invokes plugs for all the application infrastructure services configured for this container. The plugin can then retrieve the metadata and use it to perform the work. If the actual infrastructure service is implemented as a set of libraries, then the plugin can invoke those libraries or if it represents a remote service then it can communicate with that remote service in a manner that is specific to that infrastructure service. In any case, the runtime is not aware of the details of the operation—it simply invokes the plugin and passes it the runtime invocation-related data.

Each infrastructure service is therefore required to implement the plugin interface as a precondition to it becoming part of an infrastructure. An infrastructure service may provide different plugins for different deployment domains. The location and other necessary information required to load the plugin is part of the metadata of the infrastructure service.

A business service implementation is an implementation of the business behavior that a service is expected to provide. This behavior should be implementable in a manner independent of how it is accessed. For example, it should be possible to implement the business logic for a procurement service without being specific to Jave Platform 2 Enterprise Edition (J2EE)-based access or Microsoft .NET based access. However, once the service has been constructed, it may be deployed in a virtual container 320 that is specific to the underlying platform. This virtual container then decouples the service implementation from the infrastructure in which it is deployed.

This virtual service container 320 is conceptually similar to a J2EE container to the extent in that it provides the several needed services such as transaction and database management. However, unlike J2EE like containers, these services are not fixed but can be added, removed and updated. The virtual container 320 of the preferred embodiment is a higher level concept. It views an environment as a collection of discrete higher level services and recognizes the need for business services to be integrated with those higher level services. It limits its scope to the infrastructure level services and does not provide those services that are needed for implementing the business logic, such as database management.

The container is called "virtual" because it itself is a platform independent definition rather than a physical implementation. It is described in terms of metadata. The metadata for the container describes the business service implementation that is it hosting. This service was built using the development tools and its definition is part of the development metadata. In an integrated system of tools, the deployment tool may retrieve this definition from the development metadata repository.

The metadata for the container also describes one or more application infrastructure services required by the virtual container. When a virtual container is created, it is created for a particular deployment domain. This deployment domain is already preconfigured with one or more infrastructure-level services. The deployment engineer can select from those infrastructure services and integrate them into the container using visual mechanisms such as dragging and dropping them on the container. At this time, the tools may invoke the plugin and bring up the set of properties necessary to correctly use the infrastructure-level service.

Once the virtual container has been defined, there is enough metadata to generate a physical implementation of the virtual container, build it, package it and transfer the required binaries to the host. Once this is done, the business service is ready to be deployed and used. When the code is generated, it is generated according to some pre-defined mappings of the metadata to the underlying platform. So for example, the physical implementation for .NET platform may be quite different from the physical implementation for J2EE. These mappings define what elements of the metadata generate what kind of code for the underlying platform.

Many underlying platforms either need to add software code that is specific to them or require certain information in various configuration files for the applications to function properly. For example, an application infrastructure service using microsoft's implementation of WS-Security specification requires certain information to be placed into the .NET specific configuration files. Also, some application infrastructure services may need to insert specific programming code in the generated code. For example, a load balancing service may need to insert specific programming code in the generated container code as well as the generated client proxy to properly exploit its capabilities. For this reason, the code generators involve the application infrastructure service plugs in the code generation process. When code generator starts, it also loads the plugs for the infrastructure services being used by the container. All code to be generated, whether it is language code or configuration code is represented in XML. The code generator first creates XML documents for all the code that it wants to generate. It then invokes the infrastructure service plugs and provides them an opportunity to add code specific to them by passing the XML documents representing the code to be generated. Once all the plugs have added their code, the code generator converts the XML documents back into either language specific code or configuration code, as necessary. This way, the code generation process can be kept completely independent of a particular infrastructure service while still allowing them to customize the generated code.

The separation between the business service implementation and the underlying environment provides two benefits. First, it allows the underlying application infrastructure and the business service implementation itself to evolve independent of each other. Secondly, this allows the physical manifestation of the hosted service to leverage fully the capabilities offered by various infrastructures. This is explained in more detailed below, but simply put it means that the virtual container 320, through metadata 330 and visual tools, can be visually composed to integrate one or more services offered by the underlying infrastructure. Since this integration is performed through the virtual container and at configuration time, it does not become part of the service implementation itself. The same procurement service can then be configured and deployed in two different deployment domains providing different levels of service.

Once the container has been configured and its software code has been generated and built, a package can be created that includes all the necessary platform specific binary assemblies required for this service. This package is then placed in a master vault. At this point, a visual deployment tool can provide some mechanism such as drag-and-drop to deploy this business service on any machine that is part of the deployment domain. If a host is then dragged and dropped on the virtual container, its package is collected from the master vault and brought over to the machine being dragged and dropped. This package is then opened up and its contents are extracted. These contents are then configured in a manner that is specific to the underlying platform.

The actual addressable and accessible service is then provided by the physical form of the virtual container 320 which can be specific to the underlying environment.

The traditional definition of management services tools 310 are network managers. The management services and tools described here have more application level context than the system level context. Some examples of management tools are business service monitoring tools, service level agreement (SLA) managament tools, fault tolerance tools, application event handling, billing and accounting services or user profile management.

Various application infrastructure services may provide their own management tools that will use the data collected by their plugins.

The most fundamental and core capability of this architecture is the metadata 330. The metadata described here is logical metadata. Logically, each deployment domain 300 has its own instance of metadata 330. This metadata describes the deployment domain itself in terms of the infrastructure services that it is able to offer and the virtual service containers 320 that are deployed in it.

As a general rule, the exact form that the metadata is stored in is not important. The platform can choose an XML format, a relational database or some binary form.

Figure 4:
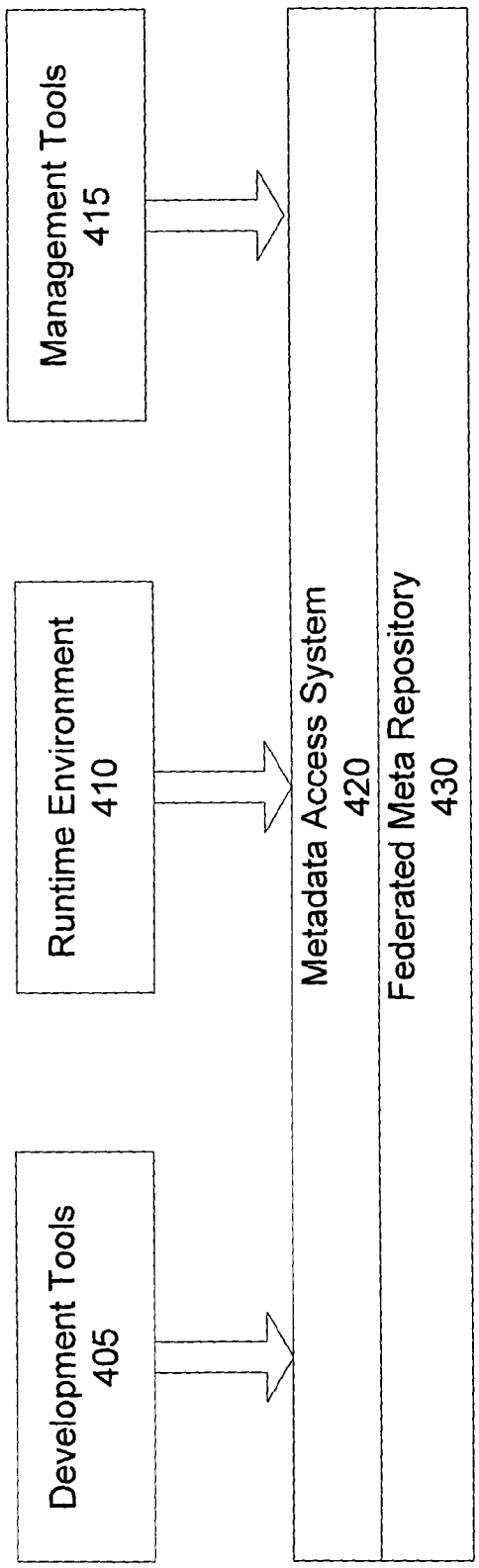
FIG. 4 illustrates a federated metadata storage and access system in accordance with a preferred embodiment of the present invention.

FIG. 4 illustrates a federated metadata storage and access system with various possible clients of the metadata. The development tools will require metadata that describes the team development environment and will allow sharing of development artifacts. One exemplary implementation of the metadata architecture is illustrated below.

The metadata has been described above as a part of other elements. It is useful to note that the two kinds of metadata that are relevant here are configuration/deployment metadata and operational metadata.

The configuration/deployment metadata is used by the configuration and deployment tools as well as by the runtime system. This data will not change often but will rather be accessed concurrently by large number of users. A configuration metadata server should preferably offer extensive caching features where the data is handed out with a time-to-live parameter indicating how long the client can use the data before being required to refresh it.

Operational metadata is used by one or more infrastructure services such as a monitoring service, load balancing service, and fault-tolerance service. This data tends to change very frequently and the tools that present this data, for viewing and analysis, may be required to refresh based on user preferences.

The following is an exemplary case use in accordance with the preferred embodiment. Here, we look at a typical use case scenario of a large bank that serves consumer loan market. The bank has a large internal IT organization, responsible for delivering the business services to its users. The IT organization has to overcome the challenges of building applications that will survive the changing technology. Furthermore, the enterprise considers the conformance of industry standards as its strategic goal.

The two initial applications that have been identified have different needs. The first application is an Online Loan Approval System. Although the logic for credit-approval already exists in the form of many small systems, the bank wants to build a new system that uses that logic but re-implements it in a more consolidated and scalable manner. Previously, the bank employed a large loan approval department that received the loan requests either through fax or telephone and used these multiple systems to score the applicant's credit history and make the loan decisions. However, the bank wants to make this system available online so that the applicant's could themselves apply for the loan. In addition to its potential clients, the bank may also decide later on to make this system available to its smaller business partners to get credit history of clients and to provide services such as credit risk scoring. For those services, the bank may charge those business partners on a per-transaction basis.

The second system is an application, called Customer Service Online system, that will allow bank's consumer loan clients to get the status of their accounts, directly without going through customer service. This information already exists in a legacy J2EE system that is deployed in the internal secure network. The bank wants to build a front-end web service to this system.

In order to meet its strategic technical objectives, the bank has standardized on toolkit in accordance with the preferred embodiment. The bank also has a well-structured group that runs its data centers. The data center has system architects and system administrators who collectively run the managed environment for all the bank's applications.

As is with any system, the normal steps of requirements gathering and requirements analysis are performed. These steps are no different than any other application development project. However, once the requirements have been analyzed, the application architect will transform the requirement for the Online Loan Approval System into a business interface. This business interface becomes the contract that has to be implemented. The logic that implements this business interface is termed as the business logic that has to be developed.

The application architects use a off-the-shelf modeling tool to model the service contract. This contract identifies the operations (business functions) that the service exposes, defines a type system that defines the data required as inputs or is returned as outputs by those operations. This business interface is critical data because it defines the Contract between this business service and its users. Once the application architects have stabilized the business contract, they extract contract information from the modeling tools and generate metadata in a metadata repository, in accordance with the preferred embodiment.

The development team then takes this business contract and conducts a detailed design and develops the business logic. The development team decides to use C# as the development language and the implementation is developed as C# assembly.

The development team only focuses on implementing the business logic as required by the business contract. They do not address other key issues such as security, billing or scalability. Their efforts are strictly focused on building one or more assemblies that implement the business logic.

Once the implementation has been built and tested in stand-alone mode, an implementation package is created that contains the necessary metadata and DLLs and is handed over to the data center that is responsible for deploying and managing bank's applications.

The customer service system presents a different scenario than the first one. The bank really does not want to change the exiting system. The system works well and already has all the necessary functions required to fulfill the task. However, this system was purchased by the bank from a 3rd party and provides no way for bank to expose it to external users and is not manageable.

The application architects have decided to use a system in accordance with the preferred embodiment to build a front-end gateway service that will expose the functionality of this system to the external users and will conform to the strategic goals of the bank in being standards compliant and be manageable.

This process is very simple. The introspection capabilities of the preferred embodiment are used to analyze the J2EE interfaces exposed by the existing applications. From these, then one or more functions are selected and system then automatically generates the required metadata, populates the metadata repository and then generates a gateway implementation that can delegate requests to the existing system. As in the previous case, this gateway implementation is then packaged in JAR files and an implementation package is created. This implementation package is then handed over to the data center that is responsible for configuring, deploying and managing bank's applications.

Once the data center receives an implementation package, it is ready to configure the service. It is assumed that by this time the minimal metadata that describes the service interface has been defined in the metadata repository.

The data center already has several different deployment domains configured. The data center also uses several infrastructure services such as Security. For some of its infrastructure services, the vendors provided toolkit-compatible plug-ins and for others the data center wrote its own. In either case, those infrastructure services are properly configured for the preferred embodiment and fit in its plug-and-play architecture.

Configuring a business service involves several different steps that allow a business service implementation to be transformed into a managed and hosted web service.

The business service implementation provided to the data center is an implementation package that contains one or more DLLs or JAR files that implement the business behavior. These implementations lack the appropriate environment required to make the business service addressable and hostable and they also lack the necessary infrastructure capabilities such as security.

The first step that the system architects do is to define a virtual container. This virtual container extends the metadata describing the service contract with metadata relating to the desired infrastructure services. This metadata will be used later on to create a physical web service that will provide a proper execution environment for the business logic implemented by the developers and will provide the flexible management environment required by the data center to perform its functions.

During this process, the system architects also decide what infrastructure level capabilities (security, transactions, etc.) are required for this business service. They then use the drag-and-drop facilities available in the visual composition environment of the preferred embodiment to create this container. As new infrastructure services are dragged onto the virtual container, these infrastructure services plugs are invoked by the graphical environment and at this time, these plugs populate the metadata with a set of properties that they would like to be customized. The graphical environment then presents those properties in a property editor and lets the system architect provide unique values of those properties. They can also customize the container itself by setting its logging levels as well as choose the correct QoS parameters such as various delivery modes.

Once the virtual container has been configured, the system architects can select the target platform for this web service. For example, if the business implementation is written in Java, then the potential target platforms can be any of the J2EE environments supported by the installation. Alternatively, if the implementation was provided in DLLs, then the target platform can be Microsoft's .NET environment.

Once the target platform has been selected, the composer tool can generate the code necessary for a web service that can be physically deployed and managed and then build that code along with the provided implementation into an executable. The composer then creates a deployment package that contains all the necessary DLLs or the JAR files required for deployment.

This package is then automatically placed in a master vault that is managed by the system of the preferred embodiment. All machines that are configured in the data center have an agent service running on them. These agents cooperate with each other to transfer packages in and out of the master vault and configure particular underlying target platforms for business services.

Once a deployable package has been created for a web service, the composer tool can be used to drag different hosts on a business service. This drag-and-drop operation triggers the actual deployment process.

When a host is dragged on a business service, the SOA Agent running on that host retrieves the deployment package from the master vault, unpackages it on that machine, performs the steps necessary to configure the underlying environment and makes the web service addressable.

A web service can be undeployed from a host by selecting that host in composer tool and simply deleting it from there. This results in all traces of that package being removed from the machine.

One a service has been deployed, it can be easily managed. Whenever, a request is sent to that service, the physical container provided by the runtime environment receives it. The runtime environment then executes all the necessary infrastructure services configured for this container and then invokes the business implementation provided by the user. When it gets the response from the business service implementation, it re-invokes any necessary infrastructure services and sends the response back to the caller.

As the technology changes, the infrastructure services can change. The system architects can use the composer tool to slowly transition the deployed business services from an old or obsolete module to a new module by simply removing the old plug from the business service and using drag-and-drop to configure the business service with new plug. The preferred embodiment automatically removes older DLLs or JARs from the physically deployed services and copies the new ones for the new plug. The business services adjust to the new infra-structure service without the typical need for interruption and modification.

To continue the bank example, after the Online Loan Approval service has been deployed, the bank decides to make that service available to its business partners for a price. An internal infrastructure level billing service is developed (along with its toolkit compatible plug) and configured. The system architects simple drag this infrastructure service on the Online Loan Approval service, without modifying the business implementation or bringing the service down. The preferred embodiment automatically modifies the metadata, reconfigures the deployed services and the runtime environment starts using this new infrastructure service when requests are sent to the business service.

One specific feature of the preferred embodiment is a visual composition environment. The preferred embodiment uses visual tools to generate metadata. These tools can present the core metadata in a tree structure as shown in FIG. 5.

Figure 5:
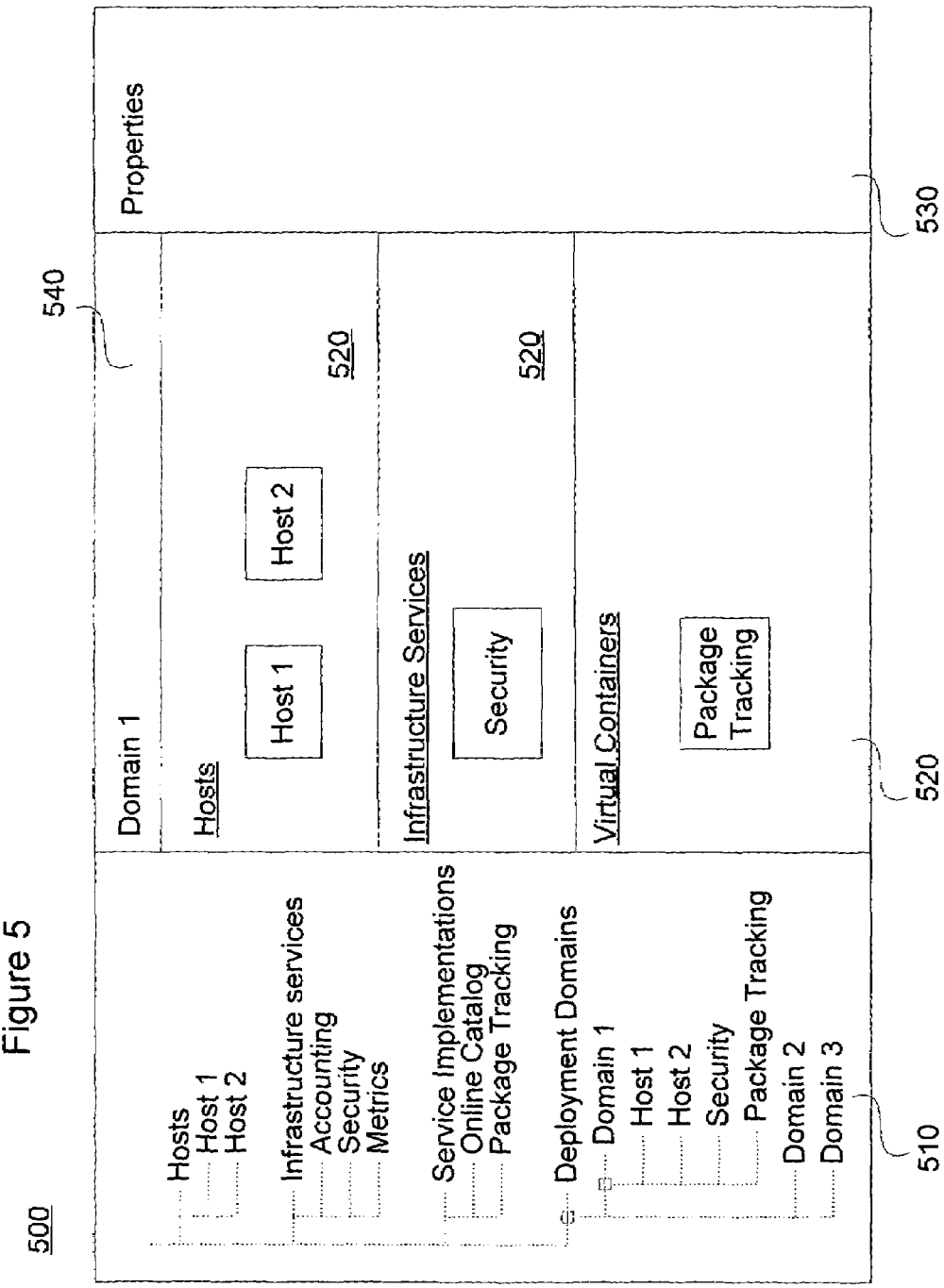
FIG. 5 depicts a virtual composition environment in accordance with a preferred embodiment of the present invention.

FIG. 5 shows an exemplary user interface 500 for a visual composition environment in accordance with the preferred embodiment. GUI interface 500 is divided into multiple areas, including available objects area 510, active object identifier 540, related objects area 520, and properties area 530.

Available objects area 510 shows all objects that are available to be configured or deployed, including hosts, infrastructure services, service implementations, and deployment domains. The folder named "hosts" contains the list of all available hosts in the entire managed space. The information that is visible for each host in this list can be such as the name of the server and its machine address.

The folder named "infrastructure services" contains a list of all available infrastructure services. This information preferably does not contain anything more than the name of the service and its description and purpose. These are all the infrastructure services available to be deployed.

The folder named "implementation services" contains all the implementation packages that have been made available. Each of these contain the related metadata describing the service contract as well as the binaries that contain the actual implementation of that service contract behavior. It is also possible to further group the service implementations.

The folder named "deployment domains" contains the deployment domains underneath it. Each deployment domain can have a folder of its own. Each deployment domain furthermore has one folder for each virtual container in it. The folder for the virtual container all the infrastructure services that it is configured with and all the hosts that it is deployed on.

Active object identifier 540 shows which object is currently active. Here, "Domain 1" is the active object; this label will change to correspond to whichever object the user is acting upon. This area is actually sensitive to whether a deployment domain is selected or a virtual container is selected.

Related objects area 520 shows all objects, grouped according to type, which are currently associated with the active object. In this example, because deployment domain "Domain 1" is the active objects, the related objects area 520 shows all hosts, infrastructure services, and virtual containers for business services that are currently deployed in Domain 1. In this example, both Host 1 and Host 2 are associated with Domain 1, and the Security and Package Tracking services are deployed in Domain 1.

Note that if, for example, "Host 1" were the active object 540, then the related objects area 520 would display all deployment domains, infrastructure services, and virtual containers related to Host 1. Whatever type of object is showing as the active object 540, the other types of objects will be show in the related objects area 540.

Finally, properties area 530 is used to define and modify the properties for any object. When an object is selected anywhere in the user interface 500, any customizable properties related to that object will be shown in properties area 530. The user may then edit these properties as appropriate.

Using interface 500, the user can select an active object 540, then drag and drop objects between the available objects 510 and the related objects area 520. When an object is dragged from the available objects area 510 into the related objects area 520, the system will then perform all necessary file generation and configuration, as defined by the appropriate properties, to actually form the logical relationship between the dropped object and the active object. This process is described in more detail elsewhere in this disclosure, and the implementation is within the abilities of one of skill in the art.

For example, if the "Online Catalog" service implementation were dragged into the related objects area 520 when the active object 540 is "Domain 1," then the system will automatically generate all necessary binaries, and transfer and install them as appropriate, to deploy the Online Catalog service in the Domain 1 deployment domain.

In the same manner, if an object is dragged out of the related objects area 520, then the system will remove its logical relationship with the active object.

Up to this level, the elements are those that exist in global space. These are elements or pieces of metadata that are not specific to a deployment domain. Further into the deployment domain, the metadata becomes more specific.

One or more hosts can be prepared to host a deployment domain. Similarly, a single deployment domain can span multiple hosts. All the hosts configured for a specific deployment domain appear in the folder belonging to that deployment domain. These nodes may contain data such as the working area to store different deployment packages containing different binaries and configuration files belonging to the infrastructure as well as business services in that deployment domain.

An infrastructure service can be configured in multiple deployment domains and a single deployment domain will have multiple infrastructure services. This relationship is similar to the many-to-many relationship that the hosts have to a deployment domain. When an infrastructure service is configured for a deployment domain, its related software, such as its plugins, is physically transferred to all the hosts that are configured for the domain.

When a new virtual service container is created, it is ready to be deployed to any of the physical machines. Each container has a folder of its own underneath the deployment domain folder. The list of hosts that appear here are the hosts where this container is physically deployed and the list of infrastructure services are the ones that his container is configured to use.

By organizing the information like this, a visual tool of the preferred embodiment can use drag-and-drop capabilities to compose the virtual service container.

Figure 6:
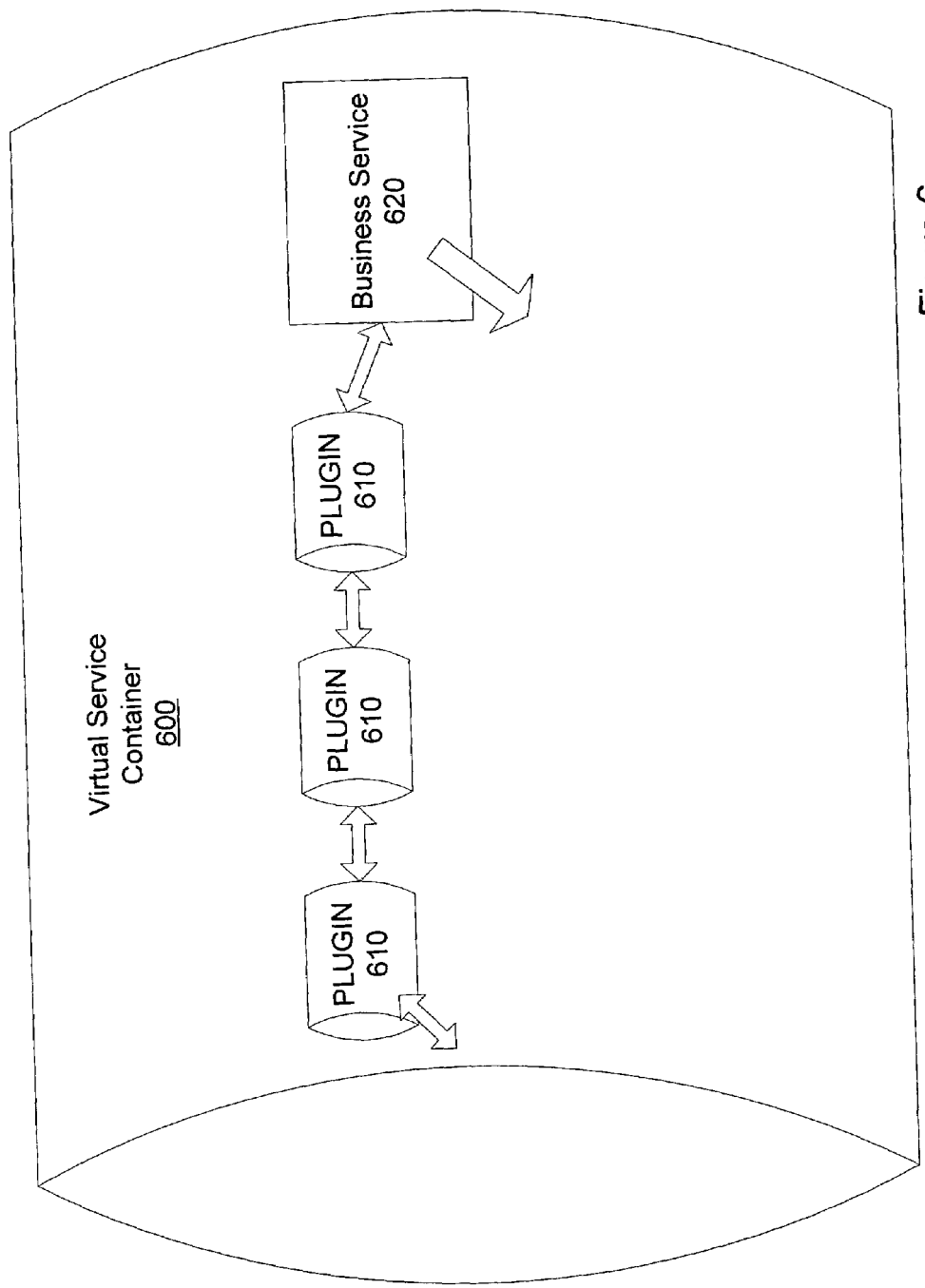
FIG. 6 depicts a block diagram of a virtual container accordance with a preferred embodiment of the present invention.

FIG. 6 shows an exemplary virtual container represented on a canvas. In this figure, the larger outside cylinder is the virtual service container 600. The smaller cylinders inside the larger one represent the plugins 610 for the infrastructure services. At the end of the chain is the business service implementation 620 that the virtual service container is hosting. Using this representation, the user can drag and drop infrastructure services, configured for that domain, from either the tree structure or a graphical palette. Similarly, the container can be dragged onto a host in that domain, thus triggering the physical deployment.

Another feature is the unique customization of the use of the configured infrastructure properties through a system of property sheets. When a virtual container is configured with an infrastructure service, at that time the preferred embodiment loads the plug of the infrastructure service and invokes the plug, providing it the empty collection of property sheets. The plug responds by populating this collection with property sheets that contain properties that it is interested in. The runtime system and the composition tools do not know anything about these properties. One the plug has populated the property collections with properties specific to it, the composition tools presents those properties in a property editor that allows the user to provide unique values for those properties. These properties are then saved with the other metadata and can be changed later on. Each collection contains one or more property sheets and each property sheet contains one or more properties. This organization of properties allows for a more readable and understandable organization of the properties.

Another feature of the preferred embodiment is the code-generation capability. Once a container has been configured, its definition is complete. However, it is not yet ready to be physically deployed because it is only a definition at this point. However, since now the definition is complete, the user can select a target environment such as .NET or an EJB server. Once the target environment has been selected a code generation scheme can be selected to generate software code that maps the definition of the virtual container to the computer facilities offered by the underlying target platform. This code can then be compiled and linked with the runtime environment required by the platform and a package is created.

Various color coding schemes can be used to describe the state that the container is in. The possible stages identified include configured, packaged, and deployed.

The code generation software can additionally generate smart proxies that perform the equivalent of the virtual service container for the client. These smart proxies integrate the infrastructure services as defined by the business service for the client. For example, a business service may require the client application to authenticate itself against the security infrastructure service and send only the authentication token to the business service. A smart proxy will retrieve the metadata for the client and invoke the infrastructures configured for the virtual container that are relevant for the client environment. These plugs can then prompt the client for any data that they might require and use the runtime environment to send that data to the virtual container along with the rest of the request data.

Just as the virtual service container can be packaged into a distributable unit, the smart proxies can also be packaged into a distributable unit. These units can then be separately provided to those who are interested in building client applications to those business services.

Another feature of the preferred embodiment is software configuration capability. Once the code for the virtual service container has been generated, compiled, and packaged, the container can be placed into a packaged state. At this point, a host can be dragged on the container. This will cause the software configuration facility to perform separate steps:

It can transfer the deployment package that contains all the related files to the target host machine;

These files can then be unpackaged on that machine by this facility automatically and placed into the specific directories structure required by the underlying platform;

In the case of web services, the web server can be configured to know about the web service. Similarly in case of an J2EE, the EJB server can be configured to know about the service; and The configuration files can be placed into the proper areas.

Once these steps have been performed, the virtual service container has been transformed into a physical service that can be invoked.

At a later time, when updates are made available for either the business service implementation or the infrastructure services plugs, the corresponding packages can be updated and these updates can be propagated to all the machines where the physical business services are deployed.

Figure 7:
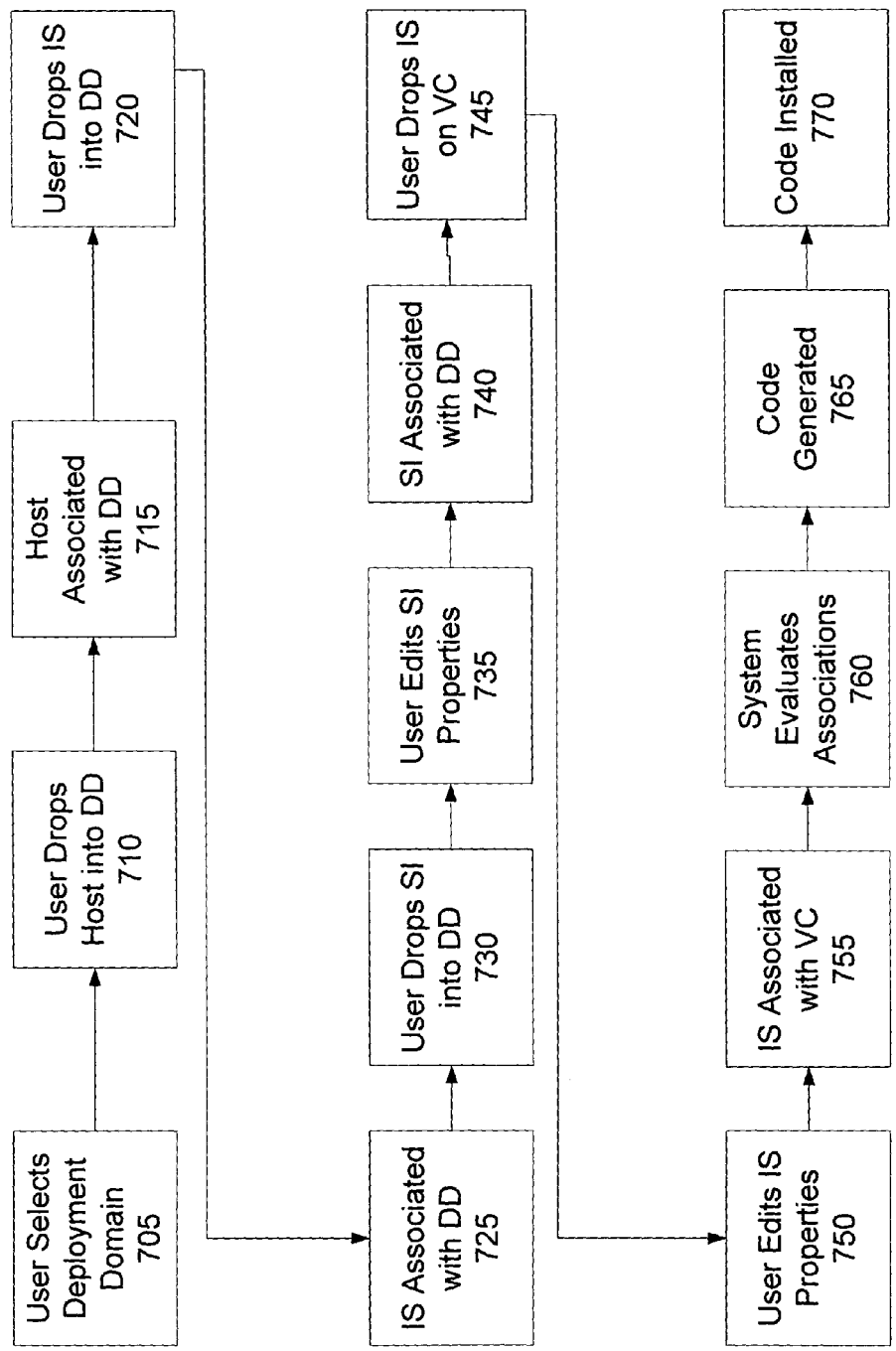
FIG. 7 depicts a flowchart of a process in accordance with a preferred embodiment of the present invention.

FIG. 7 shows a flowchart of an exemplary process in accordance with the preferred embodiment. In this process, the user accesses a user interface and selects a deployment domain (step 705). The user then drags an icon representing a host system into the deployment domain area depicted on the user interface (step 710). In response, the host is associated with that deployment domain and any other objects in the deployment domain (labeled DD in figure, step 715).

The user drags an icon representing an infrastructure service (labeled IS in figure) into the deployment domain area depicted on the user interface (step 720). In response, the infrastructure service is associated with the deployment domain and any other objects within the deployment domain (step 725).

The user drags an icon representing a service implementation (labeled SI in figure) into the deployment domain area depicted on the user interface (step 730), thus starting the definition of a virtual container, and optionally specifies properties for the virtual container (step 735). In response, the service implementation is associated with the deployment domain and any other objects within the deployment domain (step 740).

The user then drags one or more infrastructure services from within this domain onto the virtual container (labeled VC in figure, step 745), and optionally specifies the properties for the infrastructure services (step 750). In response, the system associates this infrastructure service with the virtual container (step 755).

The system then evaluates any new or changed associations (step 760). The system generates any code necessary to implement the associations (step 765), and transmits and installs the generated code as necessary (step 770). In this way, the user is able to fully manage the deployment domain, and to deploy and manage the hosts and services within it, all using a simple and intuitive user interface.

It should be noted that in the exemplary process described above, and other processes described herein, not all steps must be performed at any given time. Furthermore, many of the process steps described above may be performed in any order, or repeated, without changing the nature of the process or the advantages it provides.

It should also be noted, as discussed above, that a similar method can be used when a host or service is first selected, then other services, hosts, or a deployment domain is then associated with that host or service using the drag-and-drop technique above. Similarly, the implementing code will then be generated and installed by the system.

Configuration Architecture

The preferred embodiment provides extensive capabilities to package software modules into packages, store packages in a master location, transfer packages in and out of that master location and configuring any supported underlying platform for a web service.

Most conventional software configuration mechanisms deal with software distribution on a desktop client. The preferred embodiment manages software distribution of web services, including the software for business service as well as the infrastructure services. It also configures the diverse underlying application server platforms such as Microsoft .NET or BEA WebLogic. Using the disclosed system and methods, the users can manage the automatic distribution of web services in a distributed network, distribute software updates remotely and transparently deploy that software on the underlying platforms.

The presently preferred system uses commonly available zip and compression algorithms to package software modules and other related files. All packages, which may include programming language specific code and binaries or platform specific assemblies are stored in the same format.

Core Package

One component of the preferred system is the runtime framework. Any infrastructure service plugs or business service implementation, or business service containers require the binaries from the framework in order to build successfully.

This package contains the core binaries of the framework. There is one such package for each supported language or compilation system. Initially, there may be multiple such packages, e.g., one for building things in Microsoft's .NET environment, another for Java, and others for other virtual environments.

Infrastructure Service Package

The infrastructure services are integrated by writing plugs that represent them in the system environment. These plugs are then distributed to the machines from which these infrastructure services are being used. However, in addition to these plugs, the binaries associated with the infrastructure service itself also need to be distributed. This package, one for each infrastructure service and for each compilation environment, includes the binary code for the software plug itself, as well as the compilation environment specific binaries for the infrastructure service.

Business Implementation Package

A service implementation package contains all the binaries required for the implementation of business logic. In case of .NET, this may be a dynamic linking library (DLL) that contains the code for the business service implementation and one or more DLLs required for correct linking and execution of the business logic implementation. Similarly for Java based platforms, the package may contain either one or more class files or JAR files. A manifest file describes each of these binaries.

Deployment Package

A deployment package contains the code necessary for the physical implementation of the virtual container. It does not include the code for the system framework itself or the infrastructure services or the business service implementations. Those packages are not included because they already exist in the vault separately and are copied only when necessary.

Master Vault

Master vault is a machine in the entire network that serves as the designated repository to store various packages during the entire lifecycle of the services. In a sense it is the file-server for the disclosed platform. The work area for master vault is represented by a top-level directory.

Underneath the root of the work area, there is a sub-directory for all the available Hosts. There is a file for each of the hosts that describes that host.

There is also a sub-directory for Service Implementations. In this sub-directory, each service implementation has a folder. In this folder, the raw metadata for the service, its contract definition and the implementation packages are kept as files.

There is a directory for deployment domains here also. This directory contains separate directory for each deployment domain. In this deployment domain, all the software packages for the configured business services are kept.

The metadata describing each deployment domain and everything underneath resides in high performance servers that have a caching and federation architecture for high performance and scalability.

Agents

An agent is a software service that runs on each machine. On windows based systems, this service can run as a Windows service and on non-windows machines, it can run as a background process.

This service provides all the logic necessary for managing the vault and software configuration of the supported underlying platform. One machine can be designated as the Master Vault. The agent that runs on that machine assumes the role of the master agent. This dual personality of the agents allows any machine to be designated as the master vault. The master agent receives the requests for transfer of software packages into and out of the master vault. The master agent also maintains a directory structure on the master vault for organizing various software packages. Depending upon the task to be performed, an agent may either perform the request itself or it may delegate the request to the agent running on the master vault.

Configuration Process

The agents are responsible for correct configuration of the underlying application services platform, with the least amount of input from the user.

As new infrastructure services are available, various tools are used to create or update their packages. As mentioned before, these packages are distributed throughout the network, wherever the business services that use these infrastructures are deployed. That means that the system has to be able to propagate the updates throughout the network when needed. This propagation process is coordinated by the tools provided by the environment.

Packages for business service implementations are created and propagated in similar manner.

Creation of deployment package in the system involves multiple steps. First, an administrator uses system tools to configure a virtual container for the business service. This container exists only in metadata and is platform-neutral. The administrator then provides unique property values for fine-tuning. Next, the administrator selects a specific underlying platform and generates code for the physical container (the web service). The code generators generate code for that specific container according to the pre-defined mappings of the virtual container to the physical container. This code is then built and packaged into platform-specific packages. As described, this package does not need to include the package for the business service implementation as well as the infrastructure services, since this information is already available in the metadata.

When the administrator attempts to deploy the service to a specific host, the agents first determine the supported platforms on that machine. If multiple platforms are supported on that machine, then the user is prompted for the choice. Once the platform has been determined, the agent on the local machine collaborates with the master agent to retrieve the correct deployment package, as well the package for business service implementation and packages for all the configured infrastructure services from the mater vault. The contents of these packages are then extracted and copied to a file structure that is specific to the underlying platform. After that, the underlying platform itself is configured, e.g., Microsoft's IIS requires creation of a virtual directory while the J2EE platforms require modification of server configuration files.

Once this configuration is complete, the web service is ready to receive request.

Self Configuration & Self Healing

The preferred embodiment operates on the principal of minimum configuration and self-healing. The system is able to detect its own errors and attempt to take necessary actions to correct itself.

Infrastructure Service Integration

One particular feature of the preferred embodiment is the ability to integrate one or more infrastructure services with a business service to provide the desired level of support required for the correct operation of the business service.

This support is provided in such a way so that the infrastructure is very flexible. This infrastructure can be continually enhanced by adding more infrastructure services, removing the outdated or deprecated services or by updating the existing services with new versions.

This kind of flexibility first of all allows a managed environment to take full advantage of the changing technologies and evolving standards and new products coming onto the marketplace. The strength of the architecture is in providing a framework for making 3rd party products play in the disclosed environment rather than having to custom write infrastructure services to do what commercially available products already might do.

The infrastructure service integration capability also allows the services to be updated. So for example, if the new version of a service becomes available and the plug for that service has to be updated, the architecture should allow that kind of update as well.

The metadata that describes an infrastructure service consists of information required to load a service plug, properties that it is interested in and information necessary to determine whether the plug has relevance to client-side, server-side or both.

The information necessary for loading the plug dynamically is somewhat specific to the platform environment. For example, .NET environment would require the assembly that the plug is in and the name of the class that implements the plug interface.

The most important metadata for an infrastructure service, according to the presently preferred embodiment, is in the form of a property sheet collection. A property sheet collection contains one or more named property sheets. Each property sheet contains a set of related properties that the plug needs to tune its behavior for a specific usage. Each plug by default has a property sheet named "General" that contains some basic properties. These properties indicate whether the plug processes incoming messages or outgoing messages or both and whether it participates in the code generation process. Default values are assigned to these properties.

Later, when a business service virtual container is configured to use this infrastructure service, the plug for this infrastructure service is invoked and it adds specific properties to the property sheet collection.

The following table is an exemplary property sheet for a possible security service:

| Sheet Name | Property Name | Property Value |
| --- | --- | --- |
| General | Process Incoming Messages | true |
| | Process Outgoing Messages | true |
| | Generate Code | false |
| Authentication | Authentication Required | true |
| | Authentication Type | Service Based Authentication |
| | Authentication Domain | domain.com |
| Authorization | Authorization Required | true |
| | Authorization Resource | http://someresource.com |
| | Role Based Permission | true |
| | Role Namespace | corporate |
| | Role Property | roles |
| | Operation Domain | DemoOps |
| Encryption Properties | Encrypt Messages | false |
| | Encryption Type | Symmetric Encryption |
| | Encryption Method | |
| Signature Properties | Signature Required | False |
| | Signature Method | |

This collection has 5 sheets that provide sets of properties related to each other. This allows the plug to have multiple properties with the same name but in different sheets. Various parts of the plugs runtime can retrieve these properties and use them as needed.

The metadata also describes whether a particular infrastructure service acts only on the server side or the client side or both. It further indicates whether the infrastructure service need to participate in the code generation process to provide code that is specific to it.

Plug-and-Play Integration

Each infrastructure service is represented in the system environment through a system plug interface. This plug represents an infrastructure service in the environment. The preferred embodiment itself does not differentiate between a specific kind of infrastructure service (e.g. it does not differentiate a security service from the transaction service). To this system, all infrastructure services appear the same and it invokes them at the right points during the message processing. A message processing model, for example, makes it possible to write service implementations and client programs that have absolutely zero knowledge of what infrastructure services are executing, what inputs do they require and what kind of extra information needs to be inserted in the messages or extracted from them for the correct operation. The service plugs therefore perform all that logic themselves in a completely encapsulated manner.

If an infrastructure service is a simple service and is implemented in terms of a library, the plug would wrap that service and the service would be invoked inline. However, most sophisticated infrastructure services are standalone third-party services. For example, a security service may have a separate service process that may perform authentication and authorization. For those kinds of services, the plug actually acts on behalf of the remote service inside the tool-time or runtime environment.

The system runtime defines an abstract interface known as ServiceHandler interface. A plug for an infrastructure service first has to implement this interface.

Initializing for Use

In this environment, an infrastructure service has no significance or identity until it is selected to be integrated inside a business service virtual container, and the metadata for an infrastructure service is mostly undefined until this point. However, when a user uses the composer tool to drag and drop an infrastructure service on a business service virtual container, the plug for the service is loaded in at that time and this method is invoked on the plug and the empty metadata container is passed to it.

In response, the plug populates the metadata with a set of properties. The properties are represented generically and related properties are organized into sheets for easy organization, traverse-ability and presentation. The plugs then populate the metadata with only those properties that are required by it to provide the proper behavior at runtime when it is invoked.

There are a few general properties that all plugs have and the system provides some default values for those properties. For example, by default, a property is added to the property sheet marked "General" that indicates that this plug does not participate in the code generation process. A plug may also override such properties at this time.

In addition to manipulating this property sheets collection, the plugs may also modify other pieces of metadata. For example, by default all plugs are marked as service-side as well as client-side plugs. This means that these plugs will be loaded and invoked by the runtime, regardless of whether it is in the client-side or server-side. However, for some plugs, it does not make sense to do that on the client-side. For example, for collection of service metrics, the plug of the monitoring service only needs to be invoked on the service-side. Hence this plug does not need to be distributed, loaded and invoked on the client-side. The plug can again override these values at this time too.

Once this method has successfully modified the metadata, this metadata can then be saved in the metadata server.

Initialize For Runtime

This method is invoked by the runtime when it loads the plug into the runtime for business service virtual container. At this time the plug can initialize its internal data structures, allocate any resources that it needs to, and cache the needed metadata.

For example, if the plug represents a remote service then it would need to establish a connection with that service in order to communicate with it. Instead of opening that connection every time, the plug may need to open the connection in this method upfront and use it whenever needed.

Invoke

When the business service virtual container receives a service request, it invokes all the loaded plugs by calling this method on them. Two of the arguments to this method are the parameters that were provided with the requests, or in case of a response the response values, and the direction of the request. The direction of the request indicates whether this request is incoming or outgoing. The third parameter is the context of the request and has many pieces of information.

Since the plug interface does not differentiate methods required for client-side vs. server side and incoming vs. outgoing, the direction parameter allows determination of the direction and the context can be type-casted to either a ServiceContext or ClientContext to determine whether the plug is being invoked on the server-side or client-side.

Generate Configuration Code

The code generation process is described explained in detail below and elsewhere in this application, to the extent necessary to enable one of skill in the art to replicate the claimed inventions. Simply put, there is a strong need to provide the plugs with the opportunity of getting involved in the code generation process. If a plug has indicated that it does want that participation then this method is invoked to let the plug modify the configuration code to be generated by possibly adding its own specific code.

The plug itself will contain the XML-coded routines it requires for its configuration in the container, and the disclosed process allows each plug to ensure that the container, when it is generated, includes all the routines and configuration information the plug requires.

Of course, while the preferred embodiment uses XML code, any other computer language or code could be substituted by one of skill in the art. XML code, or a code in a similar markup language, provides a particular advantage in that it is currently almost universally accepted, and is platform-independent.

Figure 8:
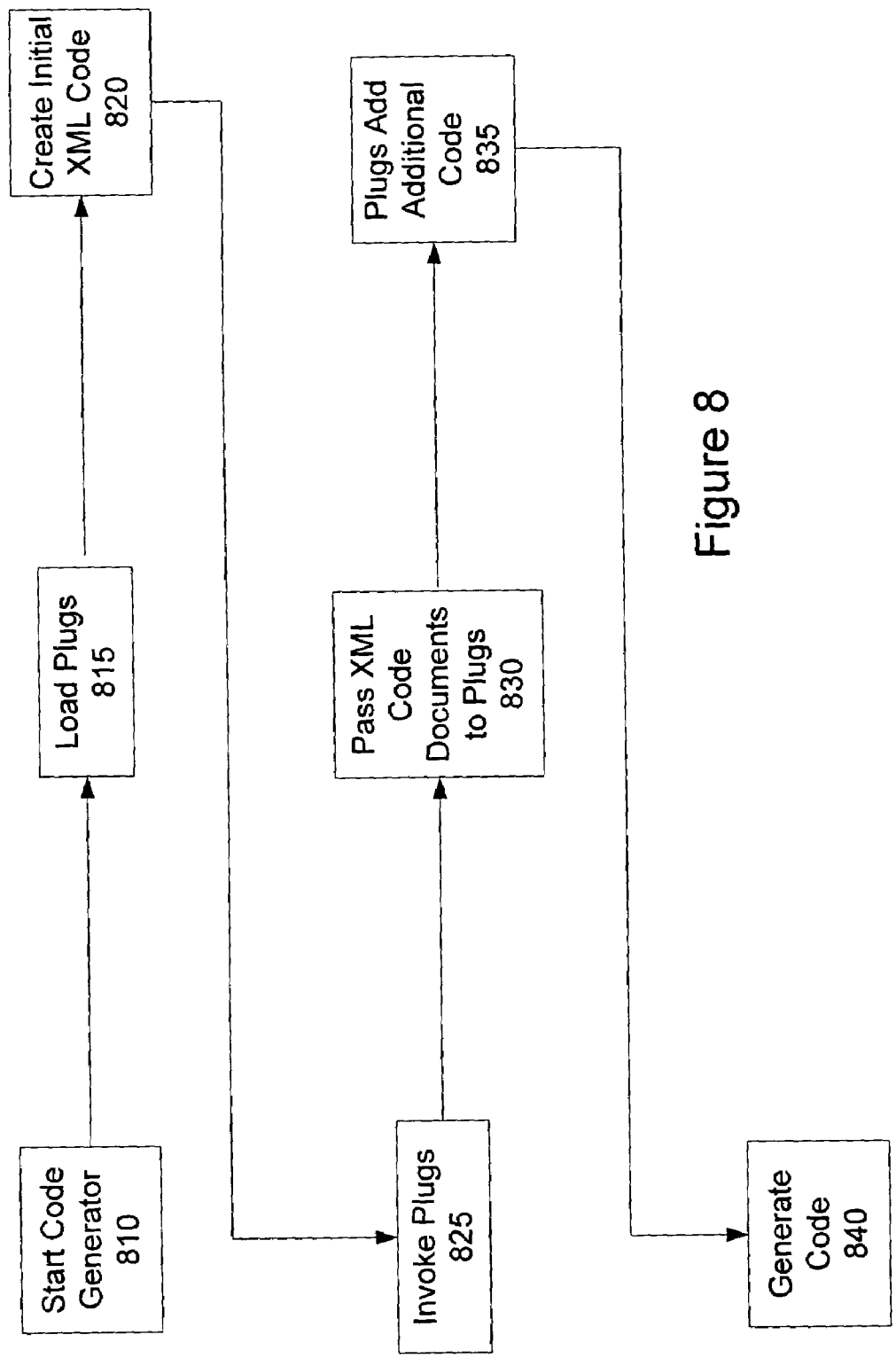
FIG. 8 depicts a flowchart of a process in accordance with a preferred embodiment of the present invention.

FIG. 8 depicts a high-level flowchart of a code-generation process in accordance with the preferred embodiment. When code generator starts (step 810), it also loads the plugs for the infrastructure services being used by the container (step 815). All code to be generated, whether it is language code or configuration code, is represented in XML. The code generator creates XML code documents for all the code that it wants to generate (step 820). It then invokes the infrastructure service plugs (step 825) and passes the XML code documents, which represent the code to be generated for that container, to each plug in series (step 830). The plugs will examine the XML code documents, and each will add any additional XML code to the XML code documents that that plug requires to be present in the container (step 835).

Once all the plugs have added their code, the code generator converts the XML documents into either language-specific code or configuration code, as necessary (step 840), and thereafter uses the language-specific code or configuration code when generating the container. This way, the code generation process can be kept completely independent of a particular infrastructure service while still allowing them to customize the generated code.

Generate Server Code

This method allows the plug to insert the code that might be essential for its operation on the service-side. The programming code itself is represented in XML and the plug adds to that XML. Later, the code generator converts that XML back to the programming language specific code.

Generate Client Proxy Code

This is similar to the above method except that it augments the code that makes up the client proxy. This is invoked only for those plugs that are client-side plugs.

Service Packaging

An infrastructure plug has executable code associated with it. In addition to the actual implementation of the plug interface for this infrastructure service, the binaries associated with the remote service might also be required. All of these need to be in the appropriate directories on the machines where the business service is executing.

System administration tools allow creation of packages for these infrastructure services. These packages are then placed in the master vault so that they can be copied to any machine for correct deployment.

Business Service Virtual Container

One significant feature of the disclosed system environment is its ability to provide a very configurable and dynamic runtime execution environment that a) provides a host for the business service implementation and b) integrates it with one or more infrastructure level services that are needed for its correct operation.

The construct for accomplishing that is the Business Service Virtual Container. This container is called virtual because it exists only in metadata definition. Furthermore, this definition is independent of any underlying platform.

The system then defines mappings of this virtual container to the physical containers for all supported underlying platform environment. Once these mappings have been defined, code can be automatically generated to produce the physical container from the virtual container.

The code for the physical container produced by the code generators is then compiled and linked with all the related binaries for the business service implementation as well as all the binaries for required infrastructure services. This is the code that can actually be deployed to an underlying platform environment and has a physical address and receive requests.

Just like the physical container generated from this metadata provides the execution environment for the service itself, physical code can also be generated for the client side proxies that are smart enough to interpret the metadata properly and can load and execute service plugs for correct usage of the infrastructure services. These are explained in more detail below.

Runtime Framework

The runtime framework is a lightweight framework that provides the mechanisms hosting a business service implementation and allowing that hosted service to also leverage capabilities offered by one or more existing infrastructure services.

On the client-side, the framework processes the request through the plugs configured for the target service. In doing this, only those plugs are processed that have relevance to the client environment. Once this processing finishes, the request is then dispatched to the actual target service via its proxy. The response is again processed through the service plugs before it is returned back to the client implementation.

On the server-side, this framework transparently intercepts all incoming requests and processes those requests through the configured plugs for this virtual container. Once all those plugs have been processed, the service request is dispatched to the actual service implementation. Once that request finishes, the response is processed through all the necessary plugs and eventually forwarded back to the invoking client.

In addition to managing the invocation of the related service plugs, the framework also provides extensive logging capabilities. The properties related to logging levels can be modified on-the-fly without any need to stop and restart applications.

The client-side and the server-side components of the framework separate the client implementation and the service implementation from the infrastructure capabilities completely. This actually allows the framework to provide various levels of quality of service such as reliable delivery and asynchronous reliable delivery. These capabilities can be customized for each virtual container.

Deployment Domains

The preferred embodiment provides mechanisms to partition a large IT environment into smaller logical partitions so that they can be configured with a set of infrastructure capabilities. Business services are deployed in a deployment domain. Generally, a set of related applications would be deployed in the same deployment domain. This deployment domain would be configured with a set of infrastructure services necessary for the quality of service desired.

A deployment domain consists of one or more hosts. These hosts collectively define the logical boundary of the deployment domain. Any business services that are part of this domain can be deployed on any of the hosts in that are part of that domain.

A deployment domain also consists of one or more infrastructure services that in turn come from the list of globally available infrastructure services. The significance of this subset of infrastructures services is to control visibility of the infrastructure services further and provide easy configuration of the business service containers.

Lastly, a deployment domain consists of one or more business service containers created in that domain. These container can then be configured with one or more infrastructure services, those infrastructure services can be customized, code for physical container be generated and the services can be deployed.

Service Contexts

A service context carries with it the necessary information that is required to process a request as well as general information that is common the environment. Service context in initialized once and then cached. If the service receives notification of changed metadata, then the service context can be re-initialized.

Client Context

This context is initialized for the client's runtime. It initializes the metadata for the client, creates the pipeline for the required plugs for the client and also initializes the logging mechanism for the client.

Service Context

This context accomplishes the same for the server-side runtime environment. One of uses of these contexts are also to determine whether a particular piece of code is executing in the client environment or the server environment. While they both derive from the class Context they can be type-casted to either one of the derived class instances in order to decide.

Loading Service Plugs

When a service starts, its metadata is retrieved and processed. An important part of this processing is to load the plugs for all the infrastructure services that the business service is configured with. Once these plugs have been loaded dynamically, they are organized into a linear pipeline and all the incoming messages are processed through that pipeline. The order of the plugs in the pipeline is the same as the order in which they appear in the composition environment. This order is important because the messages need to be processed like that. For example, if a security service needs to decrypt an incoming message, it is important that this service is the first one in the pipeline because otherwise the parameters might not make any sense to other services. Similarly, if metrics may need to collected about this service, it is important that those are taken last in the pipeline so that processing time for the other service plugs is not accounted for in the metrics for the actual business processing of the request.

These plugs are loaded in such a way so that they can be unloaded and reloaded without bringing the application down. So for example, in .NET these plugs are loaded in separate application domains. This is important because the preferred system allows dynamic configuration and reconfiguration and software updates. This is evident from the following exemplary scenarios:

1. A business service is configured with a new infrastructure service. The Composer tool modifies the metadata, copies the package contents for the new infrastructure service into the appropriate directories of the hosts that the business service is deployed on and then informs the business service container for the change. Business service container can then load the plug for the newly configured service and insert it in the appropriate place in the pipeline.

2. An infrastructure service is removed from the configuration of a business service. The Composer tool removes the plug from the metadata and removes the binaries from the appropriate directories from the deployed hosts. The business service is then informed which then unloads the plug and removes it from the pipeline.

3. A new version of the infrastructure service is made available. The Composer tool copies the new package to the appropriate hosts, the binaries are copied to the appropriate directories and the business service is informed, which then reloads the package for that service.

When a request now comes in, it is received by the business service container. This container invokes the plug for each infrastructure in the same order as they appear in the pipeline. The next plug is invoked if the previous plug is successful. The processing stops whenever a plug is unable to invoke successfully.

This kind of plug architecture allows the business service implementations to be completely devoid of any logic that relates to the infrastructure services thus making it possible to completely replace the infrastructure services and underlying products without effecting the service implementations or flow of business requests at all.

Managed Container Interface

The system container generates the shell skeleton of a business service implementation. These derive from the class ManagedContainer from the runtime framework. This managed container provides the implementation of many of the methods that are necessary entry points into the runtime framework.

When a service starts up, an instance of this class is created. This container initializes the appropriate context. Once the metadata has been initialized, the container caches it. Some of the important methods are discussed below.

Metadata Refresh

When a business service receives a request to re-initialize its metadata because it has changed, this method clears the metadata cache, unloads all the loaded plugs and then re-initializes the metadata, thus rebuilding the plug processing pipeline. By providing this method through the managed container, services can be reconfigured without the need to stop and restart them.

Logging Levels

Through these tools, the logging levels of the logging mechanism can be changed. This method changes the logging level on-the-fly.

Get and Set Application Data

Most underlying web services platforms allow the applications to execute in a multi-threaded environment, processing multiple calls at the same time in separate threads. ManagedContainer allows applications to store named sets of data in a thread-safe manner instead of saving the state information in local variables in un-safe manner.

Smart Proxies

Smart proxies provide an environment for the client-side code that performs the same kind of processing as performed by the runtime on the server-side in the virtual container. The smart proxies sit above the proxies that might be generated by tools such as Microsoft .NET platform, and uses those proxies. When a client application instantiates a smart proxy, the proxy retrieves the metadata for the target web service and for performance caches it. It then constructs a pipeline of plugs that the target service is configured with in the same manner that the server runtime does. However, only those handlers are configured that are relevant to the client.

Once this pipeline has been constructed, all requests are processed through this pipeline. This kind of processing completely separates the implementation of the actual client from the processing of the infrastructure service code. So for example, the plug for a security service may prompt the client for the necessary user credentials and package them appropriately for transmission to the server side. They may also encrypt messages or sign them as necessary. A replacement of this security with a different one would mean that their plugs are replaced and the new plug may prompt the user for different kind of information. Again, the client implementation would not rally care and know about all that.

Smart proxies may also be specialized by the intelligent code generation process. The plugs for a load-balancing service might insert code for making load-balancing decision in the smart proxy itself during the request processing.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system may conform to any of the various current implementations and practices known in the art, and unless otherwise noted herein, those of skill in the art will recognize that any claimed features of a data processing system can be implemented using conventional data processing system and data processing system network hardware, configured and programmed to operate as claimed and described. In particular, any steps of described processes can be implemented using known data processing system means.

It is important to note that while the present invention has been described in the context of a fully functional system, those skilled in the art will appreciate that at least portions of the mechanism of the present invention are capable of being distributed in the form of instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for customizing services, comprising:
    loading an initial code document;
    passing the initial code document to at least one service plug;
    modifying the initial code document, by the service plug, to produce a modified code document; and
    generating a service-plug-specific program code package from the modified code document,
    whereby the service-plug-specific program code package has been automatically customized to work with the service plug.

2. The method of claim 1, wherein the initial code document and modified code document are XML code documents.

3. The method of claim 1, wherein the service-plug-specific program code package is a platform-specific package.

4. The method of claim 1, wherein the initial code document is modified by a series of service plugs.

5. The method of claim 1, wherein the service plug represents an interface to an infrastructure service.

6. The method of claim 1, wherein the service plug adds service-specific XML code to the initial code document.

7. The method of claim 1, wherein the method is performed when a service container is created.

8. A data processing system having at least a processing and an accessible memory, comprising:
    means for loading an initial code document;
    means for passing the initial code document to at least one service plug;
    means for modifying the initial code document, by the service plug, to produce a modified code document; and
    means for generating a service-plug-specific program code package from the modified code document,
    whereby the service-plug-specific program code package has been automatically customized to work with the service plug.

9. The data processing system of claim 8, wherein the initial code document and modified code document are XML code documents.

10. The data processing system of claim 8, wherein the service-plug-specific program code package is a platform-specific package.

11. The data processing system of claim 8, wherein the initial code document is modified by a series of service plugs.

12. The data processing system of claim 8, wherein the service plug represents an interface to an infrastructure service.

13. The data processing system of claim 8, wherein the service plug adds service-specific XML code to the initial code document.

14. The data processing system of claim 8, further comprising means for creating a service container.

15. A computer program product tangibly embodied in a computer-readable medium, comprising:
    instructions for loading an initial code document;
    instructions for passing the initial code document to at least one service plug;
    instructions for modifying the initial code document, by the service plug, to produce a modified code document; and
    instructions for generating a service-plug-specific program code package from the modified code document,
    whereby the service-plug-specific program code package has been automatically customized to work with the service plug.

16. The computer program product of claim 15, wherein the initial code document and modified code document are XML code documents.

17. The computer program product of claim 15, wherein the service-plug-specific program code package is a platform-specific package.

18. The computer program product of claim 15, wherein the initial code document is modified by a series of service plugs.

19. The computer program product of claim 15, wherein the service plug represents an interface to an infrastructure service.

20. The computer program product of claim 15, wherein the service plug adds service-specific XML code to the initial code document.

21. The computer program product of claim 15, further comprising instructions for creating a service container.

* * * * *